April 19, 1938.　　　　E. ROSS　　　　2,114,608

TALKING MOTION PICTURE APPARATUS

Filed March 22, 1934　　17 Sheets-Sheet 1

INVENTOR
ERNEST ROSS
BY W. E. Beatty
ATTORNEY

April 19, 1938.  E. ROSS  2,114,608

TALKING MOTION PICTURE APPARATUS

Filed March 22, 1934   17 Sheets-Sheet 2

INVENTOR
ERNEST ROSS
BY W E Beatty
ATTORNEY

April 19, 1938.  E. ROSS  2,114,608

TALKING MOTION PICTURE APPARATUS

Filed March 22, 1934  17 Sheets-Sheet 3

INVENTOR
ERNEST ROSS
BY W E Beatty
ATTORNEY

April 19, 1938.    E. ROSS    2,114,608

TALKING MOTION PICTURE APPARATUS

Filed March 22, 1934    17 Sheets-Sheet 4

INVENTOR
ERNEST ROSS
BY W. E. Beatty
ATTORNEY

April 19, 1938. E. ROSS 2,114,608
TALKING MOTION PICTURE APPARATUS
Filed March 22, 1934 17 Sheets-Sheet 5

INVENTOR
ERNEST ROSS
BY W E Beatty
ATTORNEY

April 19, 1938.  E. ROSS  2,114,608
TALKING MOTION PICTURE APPARATUS
Filed March 22, 1934  17 Sheets-Sheet 6

INVENTOR
ERNEST ROSS
BY W E Beatty
ATTORNEY

April 19, 1938.  E. ROSS  2,114,608

TALKING MOTION PICTURE APPARATUS

Filed March 22, 1934  17 Sheets-Sheet 7

INVENTOR
ERNEST ROSS
BY W. E. Beatty
ATTORNEY

April 19, 1938.  E. ROSS  2,114,608

TALKING MOTION PICTURE APPARATUS

Filed March 22, 1934   17 Sheets-Sheet 8

INVENTOR
ERNEST ROSS
BY
ATTORNEY

April 19, 1938. E. ROSS 2,114,608

TALKING MOTION PICTURE APPARATUS

Filed March 22, 1934 17 Sheets-Sheet 9

INVENTOR
ERNEST ROSS
BY W. E. Beatty
ATTORNEY

INVENTOR
ERNEST ROSS
BY W E Beatty
ATTORNEY

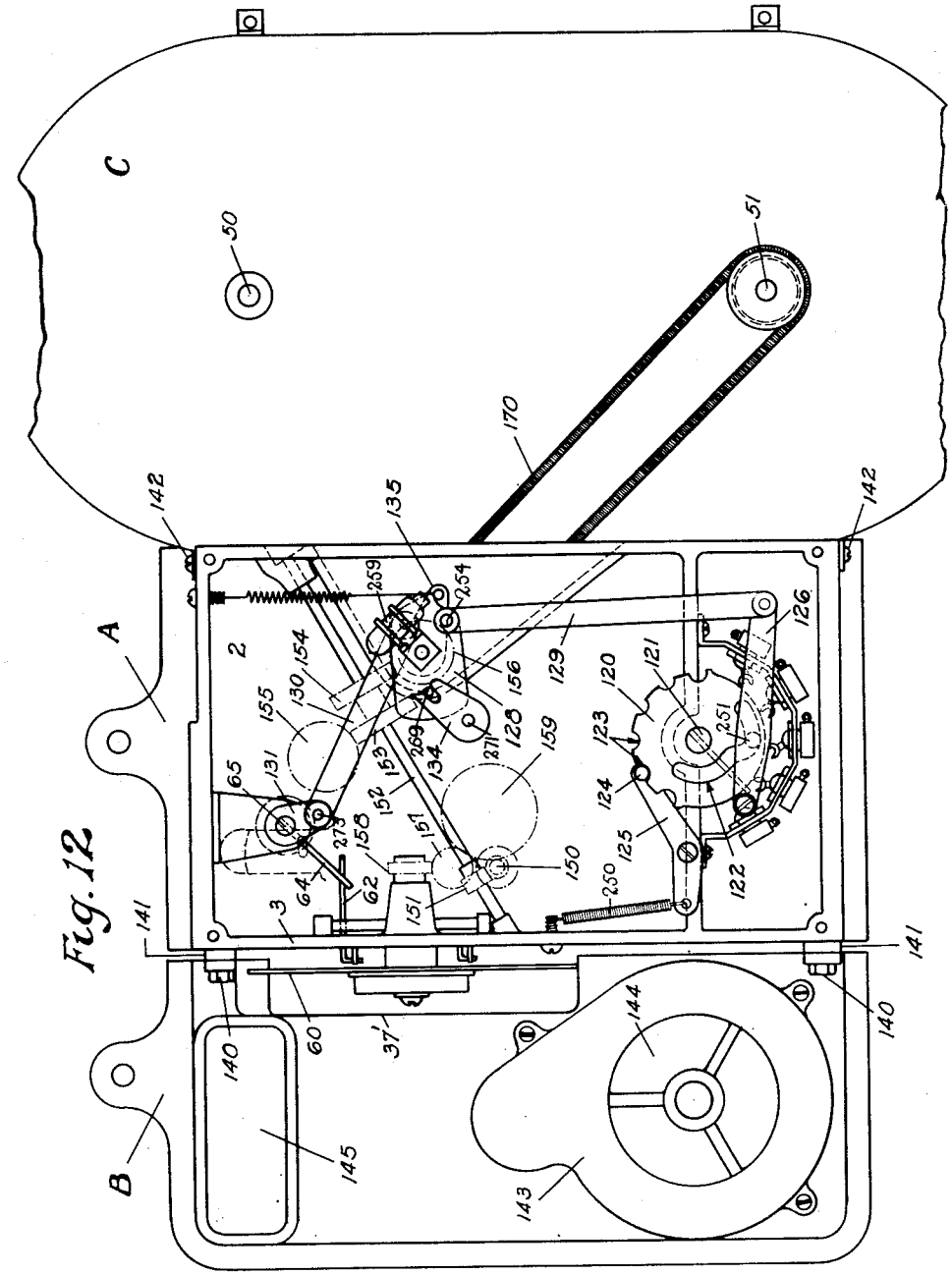

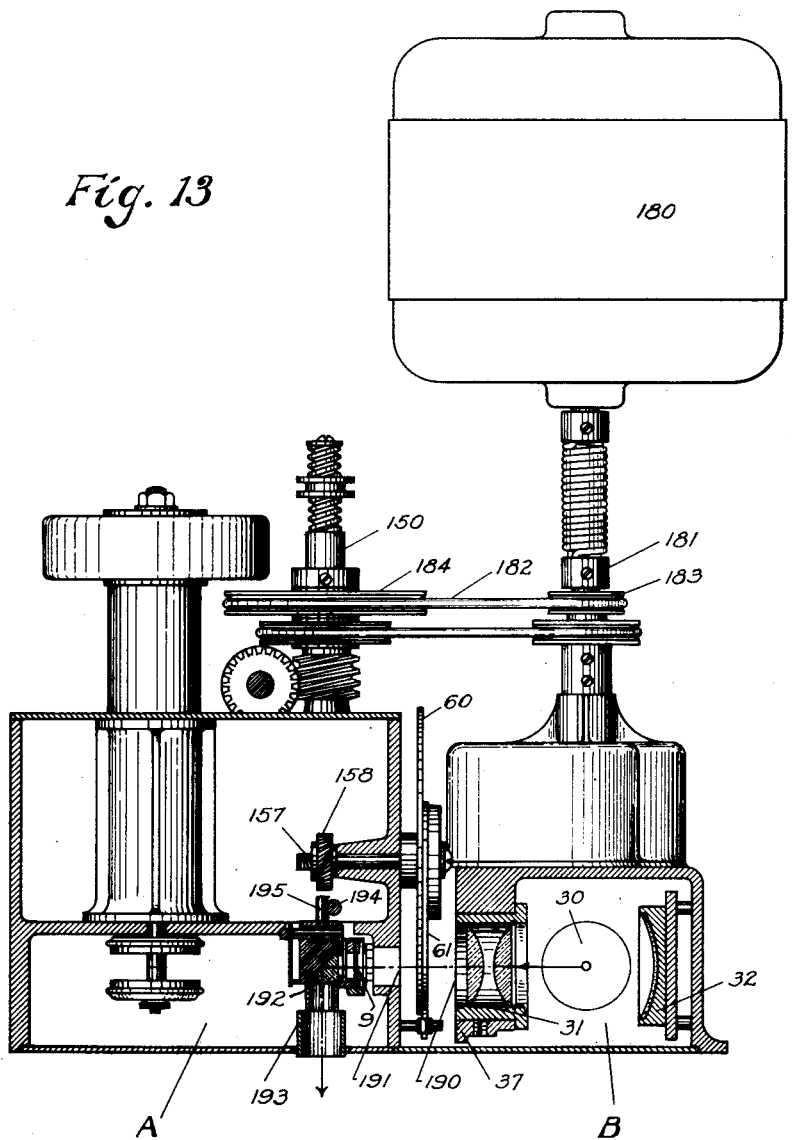

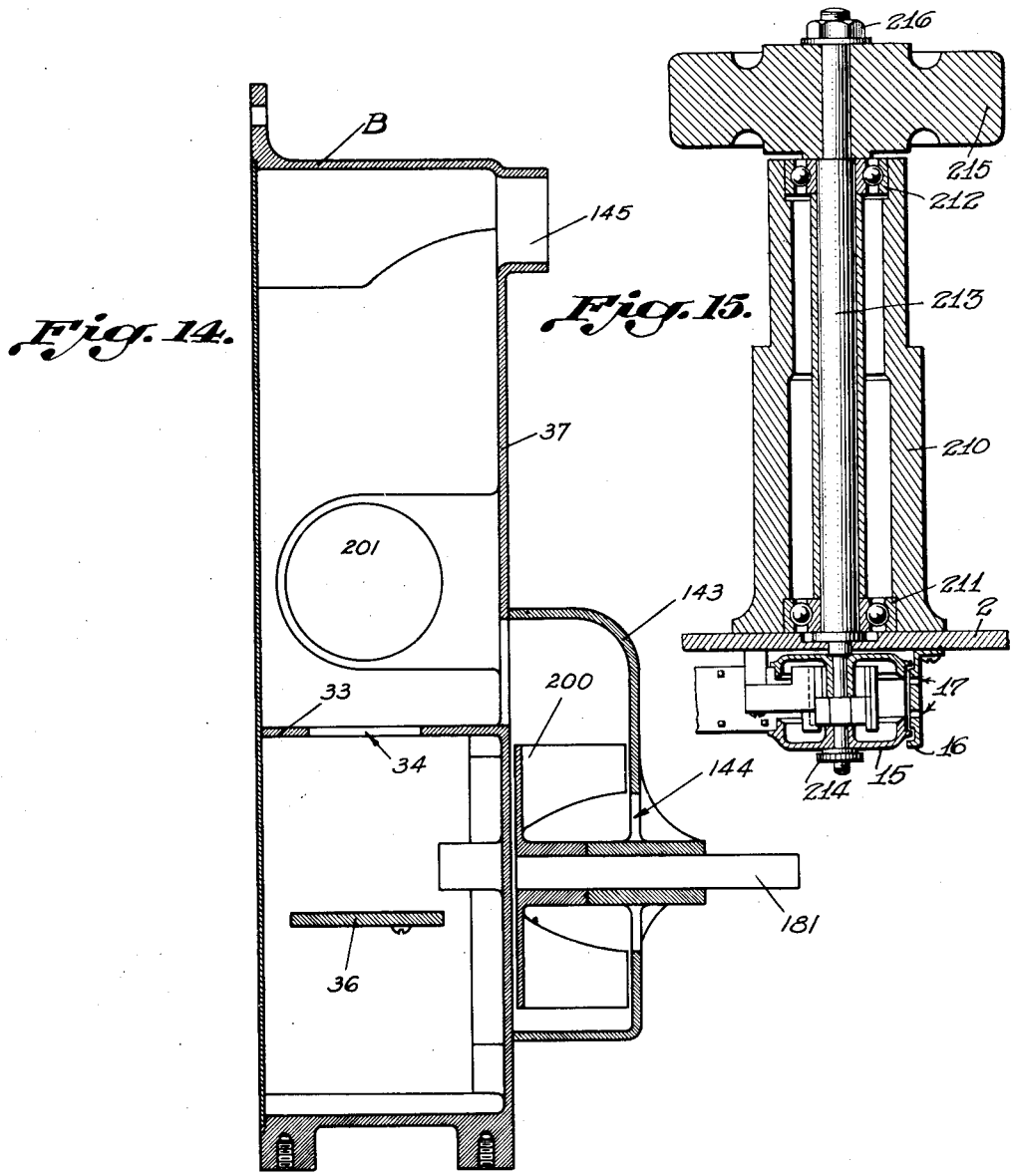

April 19, 1938.  E. ROSS  2,114,608
TALKING MOTION PICTURE APPARATUS
Filed March 22, 1934  17 Sheets-Sheet 14

INVENTOR
ERNEST ROSS
BY W. E. Beatty
ATTORNEY

April 19, 1938. E. ROSS 2,114,608
TALKING MOTION PICTURE APPARATUS
Filed March 22, 1934 17 Sheets-Sheet 15

INVENTOR
ERNEST ROSS
BY W. E. Betty
ATTORNEY

April 19, 1938.  E. ROSS  2,114,608
TALKING MOTION PICTURE APPARATUS
Filed March 22, 1934   17 Sheets-Sheet 16

INVENTOR
ERNEST ROSS
BY  W. E. Beatty
ATTORNEY

April 19, 1938.   E. ROSS   2,114,608
TALKING MOTION PICTURE APPARATUS
Filed March 22, 1934   17 Sheets-Sheet 17

INVENTOR
ERNEST ROSS
BY W E Bratt
ATTORNEY

Patented Apr. 19, 1938

2,114,608

UNITED STATES PATENT OFFICE 2,114,608

TALKING MOTION PICTURE APPARATUS

Ernest Ross, Richmond Hill, N. Y., assignor to United Research Corporation, Long Island City, N. Y., a corporation of Delaware Application March 22, 1934, Serial No. 716,808

9 Claims. (Cl. 88—16.2)

This invention relates to a combination sound and motion picture projector apparatus, specifically designed to run standard sixteen millimeter or other narrow width film carrying both the pictures and a sound-on-film record track, for the production of talking or other sound-accompanied motion pictures in the home and for educational or industrial sound picture projection generally.

The invention further relates to the provision of an arrangement for automatically threading of the sound and picture film through the picture projector and the sound reproducer and to the coordination therewith of an arrangement for controlling the application of electrical power to the apparatus and to the further coordination with the self-threading feature and the power circuit control of an arrangement for automatically disconnecting the power circuit in the absence of film in the apparatus, due either to breakage of the film or to all of the film being on the take-up reel.

The self-threading feature involves the use of film guiding members and loop formers which are movable in one position to accomplish self-threading, and into another position to permit sound reproduction and picture projection.

An object of the invention is to put the film guiding members and loop formers definitely under the control of the operator whereby he may at will adjust the apparatus to the threading position or to the running position.

This is accomplished by providing film guiding members and loop formers under control of a single hand-operated device which may be moved at will by the operator to adjust the film guiding members and loop formers to the threading position or to the running position.

Another object of the invention is to conjoin the operation of the film guiding members and the loop formers with the application of electrical power to the motor which drives the film through the apparatus and to the light source or sources therefor. This is accomplished by providing means under control of the hand-operated device referred to above for controlling the power switch.

Another object of the invention is to automatically disconnect electrical power from the apparatus in the absence of film in the apparatus or in the event of breakage of the film. This is accomplished by providing an automatic stop switch under control of the hand-operated device referred to above, the hand-operated device preparing the stop switch for operation upon the absence of film at a particular point in the apparatus.

While providing for the operations before mentioned, another object of the invention is to mount the film supply and take-up reels adjacent to each other whereby they may be conveniently handled by the operator. This is accomplished by arranging for the entrance and exit of the film with respect to the apparatus at closely adjacent points, the hand-operated device referred to above being positioned outside of or remote from that portion of the apparatus between the points of entrance and exit of the film.

A further object of the invention is to reverse the film through the apparatus in order that any desired picture on the film may be brought back in front of the projector for projection as a still picture or for repetition as a motion picture.

The invention provides for an improved construction and arrangement of the component parts, including the film picture projector mechanism and the film sound record advancing and translating mechanism, within a single housing unit which may be assembled with other component units to form a compact multiple-unit sound-picture projector chassis, readily portable or adapted to be inserted in a cabinet or other enclosure of such dimensions as to be unobtrusive.

For further objects of the invention reference may be made to the drawings wherein:

Fig. 12 is a rear view of the assembled multiple-unit chassis illustrated in Fig. 2.

Fig. 13 is a sectional view of the projector and sound system housing and the lamp housing taken along the line Y—Y of Fig. 2, and showing the electric driving motor and the driving connections.

Fig. 14 is a vertical mid-sectional view of the lamp housing.

Fig. 15 shows in unfolded section the manner of rotatably mounting the film drum of the sound system, illustrated in Figs. 1, 4 and 5.

Figure 1:
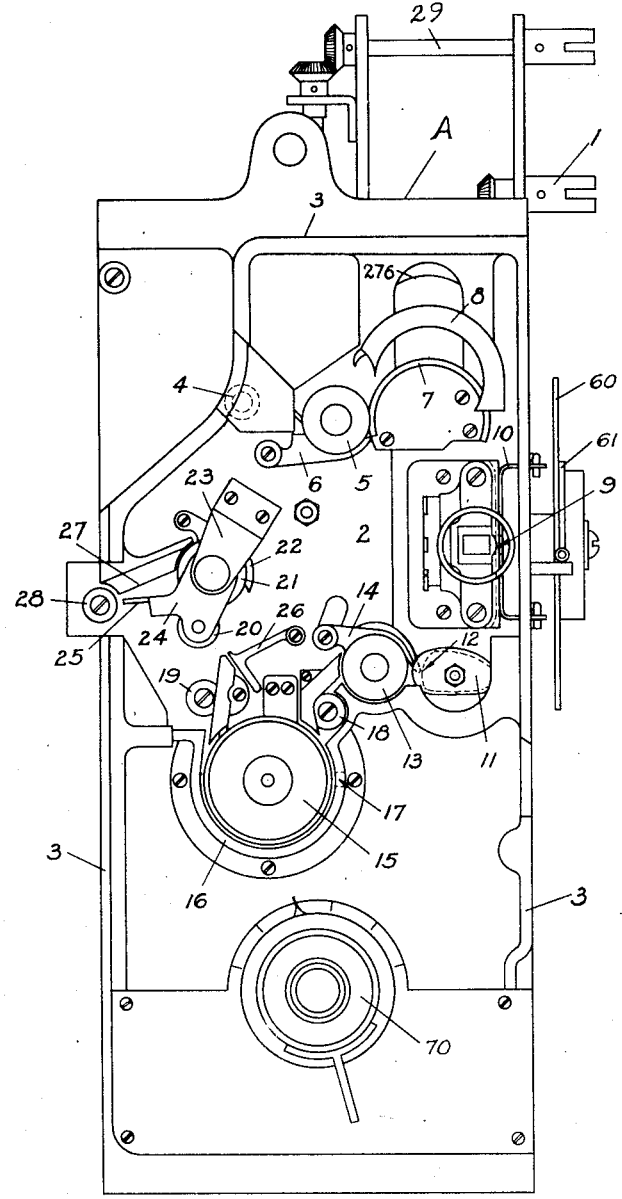
Fig. 1 illustrates a front view of the projector mechanism and sound system housing or compartment, with the cover plate removed.
Figure 3:
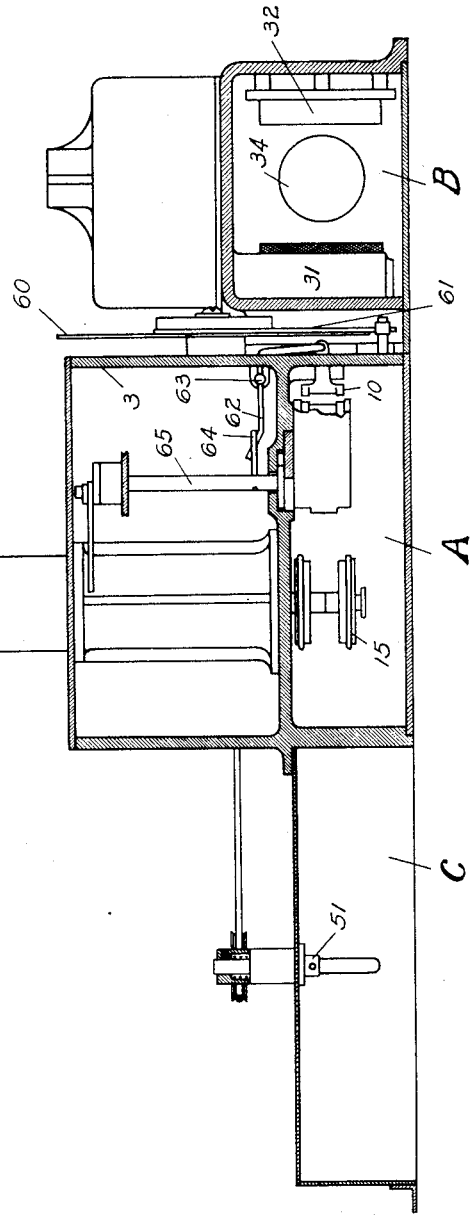
Fig. 3 is a sectional view of the assembled multiple-unit chassis taken along the line X—X of Fig. 2.

Referring now to Fig. 1, the entire picture projection mechanism and the mechanical portion of the sound system are mounted within a compartment or housing A comprising a centrally located vertical plate or support 2 provided at its sides and ends with a casing 3 having an extended surface, as shown in Fig. 3. The casing 3 may be separate or it may be integrally formed with the support 2 if desired, for example, in the form of a casting. Thus, the support 2 and the casing 3 form a partial enclosure, open at front and rear, for the mechanism hereinafter described.

At the upper left-hand portion of the compartment or casing A, a guide roller 4 is arranged adjacent the lead-in feed sprocket 5. The feed sprocket 5 is mounted and journalled on the support 2 and is adapted to be rotated by the driving motor during both automatic threading and projection. A spring-pressed shoe 6 is arranged to guide the film to, and to retain the film against and on, the feed sprocket 5 with the film sprocket holes properly engaged with the sprocket teeth.

The stationary loop-forming member 7 is fixedly mounted on the support 2 adjacent the feed sprocket 5 and, in cooperation with the movable member 8 (in the threading position), serves to guide the film in a channel from the feed sprocket 5 to and through the picture gate 9 disposed and mounted in the casing 3, when the pressure pad 10 is released from the picture gate.

Immediately adjacent, but below the picture gate 9, and mounted and journalled on the support 2, is the motor-driven rotary presser cam 11 which serves to intermittently advance the film by and through the picture gate. The rotary presser cam 11 may be of the general form disclosed in Hadley Patent No. 1,334,450, and so designed with an undercut portion 12 as to enable ready stripping or guiding of the film therefrom.

Immediately adjacent the rotary presser cam 11, and mounted and journalled for rotation on the support 2, is the motor-driven intermediate sprocket 13, the function of which is to continuously take-up film from the rotating cam 11 and to continuously feed the film to the sound-on-film record resolving and translating system (the sound system). The sprocket 13 is provided with a spring-pressed shoe 14 which insures smooth operation by firmly pressing the film onto the sprocket in such a way as to prevent chattering of the film as the sprocket teeth engage the film sprocket holes. An extending tongue portion of the shoe 14 cooperates with the rotary presser cam 11, particularly the undercut portion 12, to guide the film to the intermediate sprocket 13 in the threading operation and to strip the film from the cam 11, during projection.

Figure 4:
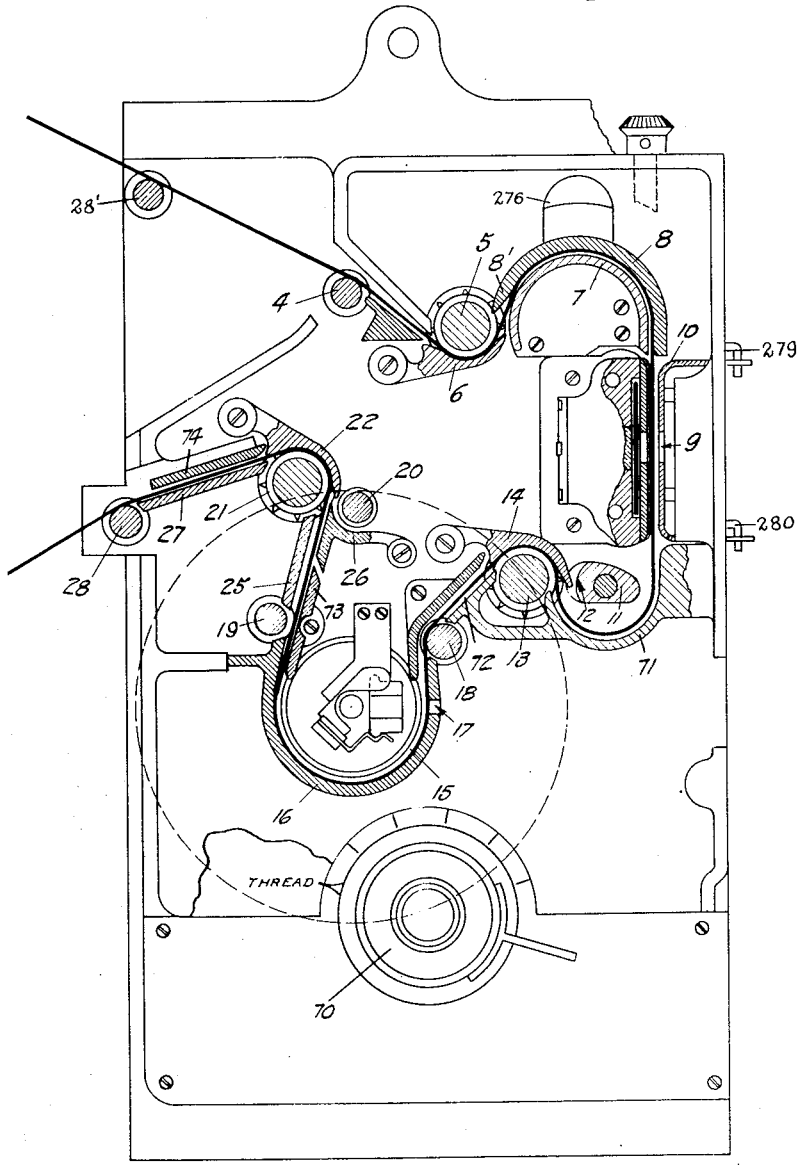
Fig. 4 is a front view, partly in section, of the projector and sound system housing showing the movable film guiding and channel forming members in the automatic threading position.

As shown in Fig. 1, and also in Fig. 4, the end of shoe 14 extends into and between the flanges of presser cam 11 so that it will effectively strip the film and guide it on its intended path.

The sound-on-film record resolving and translating system includes the following mechanical parts, all of which are mounted on the support 2: The drum 15, which is ball bearing mounted as illustrated in Fig. 15; the sound drum shoe 16 provided with two light apertures or sound gates 17 (as illustrated in Fig. 15), through which the exciter lamp rays may be focused on the sound-on-film record in the course of its passage thereby while in driving contact on drum 15.

Immediately adjacent the drum 15, there are arranged two stationary guide rollers 18 and 19 which, in conjunction with the spring-pressed roller 20, serve to apply tension to the film in its passage over the rotating drum as driven by the film. This is accomplished by the cooperative continuous film-feeding action of the intermediate sprocket 13 and the continuous film take-up action of the take-up sprocket 21. As in the case of the feed sprocket 5 and the intermediate sprocket 13, the take-up sprocket 21 is mounted and journalled on the support 2 and is driven by the motor shown in Fig. 13.

As will be observed, the take-up sprocket 21 is mounted adjacent the drum 15 and is provided with a spring-pressed shoe 22 to insure a smooth and positive take-up of the film.

By means of a bracket 23 mounted on the support 2, a journal is provided for the spring-pressed tension roller frame 24 carrying the roller 20. The tension roller frame 24 also provides a movable member in the nature of an extending tongue 25 integral therewith which, in cooperation with the movable guide shoe 26, forms a threading channel for the film from the sound system and drum 15 to the take-up sprocket 21, as will be more fully described in connection with Figs. 4 and 5.

After the film has passed the take-up sprocket 21, it is fed to the driven take-up reel, not shown, through the guiding member 27 and over the roller 28.

The proper framing adjustment of the film pictures in the picture gate 9 is accomplished, during projection, by manually rotating the shaft 29 in the proper direction, depending on the way the picture is displaced as observed on the screen. Upon rotation of the shaft 29, the intermediate sprocket 13 is displaced so that its relative operating relation or position with respect to the cam 11 is changed or altered. This causes the film to be slightly advanced or retarded lengthwise thereof so as to bring the successive film picture frames into proper registration with, and in, the picture gate 9.

The rotatable shaft 1 proves a means for manually adjusting the projector lens mounting during projection, so as to secure proper focus of the pictures on the screen, as more fully explained in connection with Fig. 16.

Figure 2:
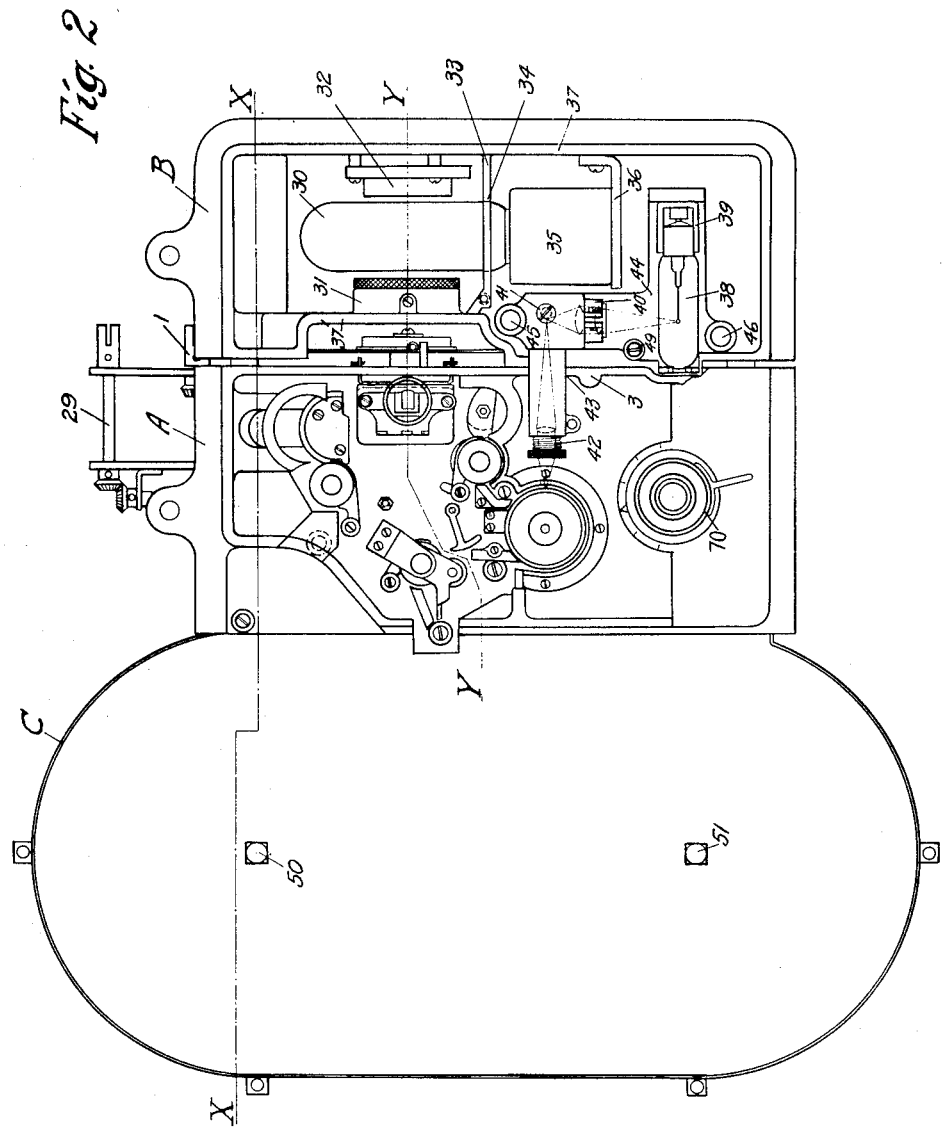
Fig. 2 shows a front view of the assembled multiple-unit chassis comprising the projector mechanism and sound system housing, the lamp housing, and the reel holder, the cover plates being removed from the projector and sound system housing and the lamp housing.

Referring now to Fig. 2, the projector and sound system housing A is shown assembled as a multiple-unit chassis with a lamp housing B and a reel holder C, the lamp housing B being secured to one side of the housing A and the reel holder C being secured to the other side thereof.

In the lamp housing B there is shown the projector incandescent filament lamp or light source 30, the condenser lens and mounting 31 and the reflector and mounting 32.

A dividing member 33 (which may be integrally cast) is provided in the lamp housing B having an opening 34, through which the projector lamp 30 may be inserted in a suitable socket 35. The socket 35 is mounted on the bracket 36 which in turn is supported from the casing 37 of the lamp housing B. Thus, the projector lamp light source 30 is isolated, so to speak, in a small compartment of its own within the lamp housing B for the purpose of localizing the heat radiated by the projector lamp 30.

Below the bracket 36 is arranged the exciter lamp 38 mounted in a form of socket and contact 39 so that the light rays thereof may be directed to and through an enclosed optical system consisting of the lens and mounting 40, a cylindrical mirror 41, and a lens and mounting 42, extending into the projector and sound system housing A through a slot 43 in the casing B.

The exciter lamp 38, its socket connection 39, and the enclosed optical system comprising the members 40, 41 and 42, are all supported on the sound optical system frame 44 which is slidably mounted on two shafts 45 and 46. The sound optical system frame 44 is thus arranged for horizontal displacement upon adjustment of the screw 49, which engages a threaded portion of the optical system frame. Thus, the enclosed optical system may be adjusted to project rays of light from the exciter lamp 38, through either one of the sound gate apertures 17 shown in Fig. 15.

The reel holder C is provided with two shafts 50 and 51. The shaft 50 is mounted and journalled for free rotation of the supply reel in the reel holder, while the shaft 51 is adapted to receive the take-up reel and is rotated by the motor driving the projector mechanism.

Fig. 3 shows the manner in which the projector and sound system housing A, the lamp housing B, and the reel holder C, may be assembled and secured together. It also illustrates the manner in which the intermittent shutter 60 is rotatably mounted and journalled on the casing 3 of the projector and sound system housing A in the space between it and the lamp housing B.

To the end that the intermittent projector light shutter 60 and a fire shutter 61 may be located between the housings A and B, the lamp housing casting is so shaped and formed as to have the proper configuration, as illustrated in Fig. 2 at 37'.

The manner in which the pressure pad 10, which is normally spring-pressed against the film on the bearing surfaces of the framing plate containing the picture gate 9, may be released therefrom for automatic film threading, is illustrated in Fig. 3. The spring-pressed pressure pad shifter finger 62 is pinioned at 63 so that, in its normal position, it permits the pressure pad 10 to contact with and frictionally hold the film in the picture gate. To the end that the pressure pad may be released, a shifter pin 64, mounted on and at right angles to the control shaft 65, moves the finger 62 inwardly when the mechanism is adjusted to the threading position. Thus, the movement of the pin 64 serves to hold the pressure pad 10 from its normal position against the film in the picture gate.

The automatic threading operation will be described by reference to Figs. 4 and 5. Referring first to Fig. 4, the control knob and key 70 will be considered as having been turned and adjusted to the threading position, as indicated. In this way, by means of a cam and link and lever connections, which will be described more in detail in connection with Figs. 10 and 11, the slidably mounted curved guide member 8 is lower in position adjacent the fixed curved member 7, so that the tip 8' serves to guide the end of the film emerging from the feed sprocket 5 through the film guiding channel (in the form of a loop) between the members 7 and 8. Thus, the film is guided from the feed sprocket 5 to, and then through, the picture gate 9, the pressure pad 10 having been released therefrom as explained in connection with Fig. 3.

As the film is being continuously fed from the feed sprocket 5, it is guided, after it leaves the picture gate 9, around the rotary presser cam 11, by means of the fixed curved guiding member 71, to the intermediate sprocket 13. The spring-pressed shoe 14, cooperating with the intermediate sprocket 13, serves first to guide the end of the film onto the sprocket 13, and to engage the film sprocket holes with the sprocket teeth thereof, and to direct it upon emerging therefrom. As the film leaves the intermediate sprocket 13, it is driven through the fixed guiding channel 72, over the roller 18, around the sound drum 15, being guided by the fixed drum shoe 16. Thereafter, it is guided to the take-up sprocket 21 by the fixed guiding member 73 cooperating with the movable guide shoe 26 and the extending tongue 25 of the tension roller frame, as shown.

Thereafter, the film passes to the takeup sprocket 21, which engages the sprocket holes of the film with the aid of the spring-pressed shoe 22. Thereafter, the film is fed through the guiding channel formed between the fixed guiding members 27 and 74, over the roller 28 and out of the projector and sound system housing, where the end of the film may be manually or automatically fixed to the drum of a take-up reel.

Thus, with the control knob 70 adjusted to the threading position, the driving motor, by rotating the sprockets 5, 13 and 21, automatically feeds the film throughout the entire projector and sound system mechanisms, through the substantially continuous and open guiding channels formed between the sprockets, and from sprocket to sprocket as will be understood.

It will be noted that the film enters the apparatus from the supply reel, and leaves the apparatus on its way to the take-up reel at closely adjacent points 28 and 28', Fig. 4, whereby the film supply and take-up reels may be arranged close to each other. Also, the hand-operated device 70 as well as the shaft 121 operated thereby are laterally disposed with reference to the area defined by the loop of film in the apparatus, and with reference to a direct line between these points of entrance and exit.

Figure 5:
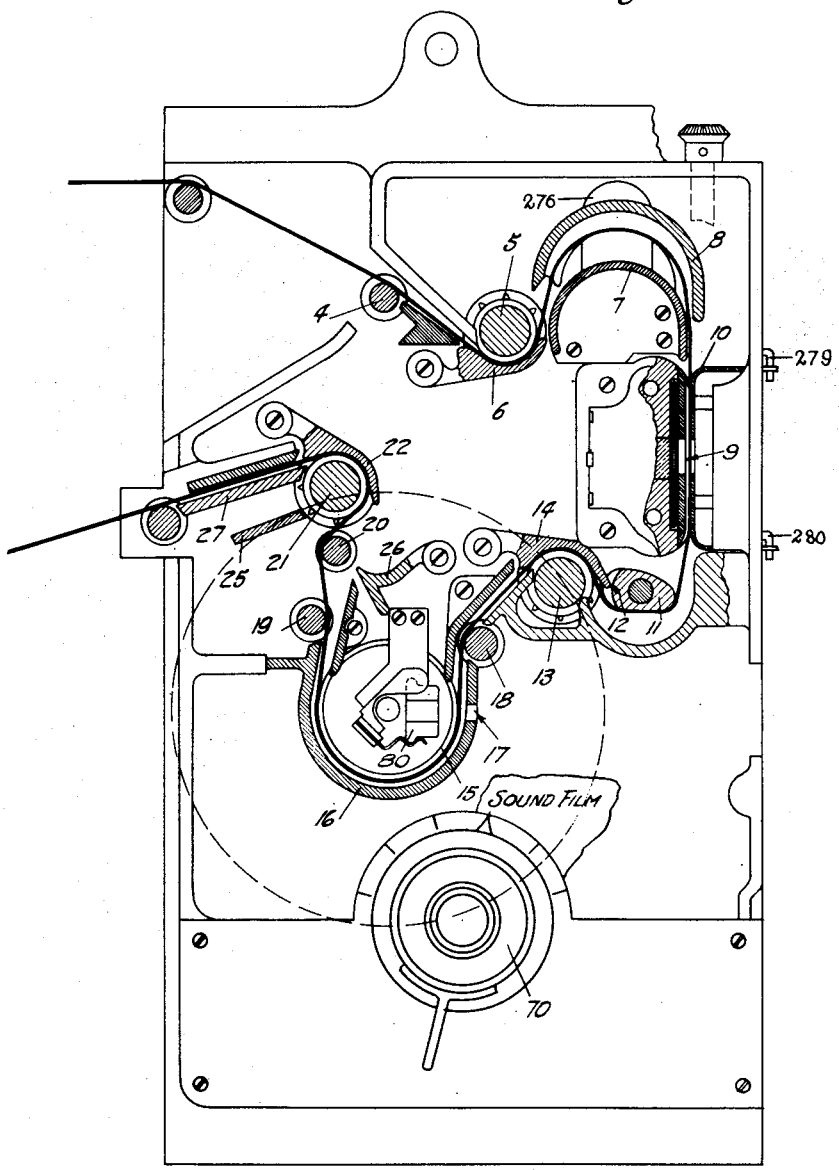
Fig. 5 is a front view of the projector and sound system housing of Fig. 4, but with the movable film guiding members adjusted to the running position ready for picture and sound projection.

Referring now to Fig. 5, the film is shown in the running position with the automatic threading mechanism and its movable members adjusted and moved out of the guiding relationship by the control knob 70, ready for picture and sound projection. It will be observed that the movable member 8 is adjusted to a position which permits the formation of a free loop of the film above the picture gate so that the rotary presser cam 11 may intermittently advance the film by and through the picture gate, against the friction of the film in the gate produced by the pressure pad 10.

It is to be noted that tension is applied to the film through the cooperation of the fixed rollers 18 and 19 and the spring-pressed roller 20 carried by the tension roller frame 24 (shown in Fig. 1). Thus, in the travel of the film from the intermediate sprocket 13 to the take-up sprocket 21, the film is maintained under tension so that it drives the freely rotatable sound drum 15.

In the passage of the film by the sound aperture or gate 17, the exciter lamp constant light rays are modulated at the point of resolution by the sound-on-film record. The sound record modulated light then impinges on the light sensitive selenium cell 80, and the cell converts and translates the modulated light into corresponding electrical variations which may be amplified and then supplied to a loud speaker.

Figure 6:
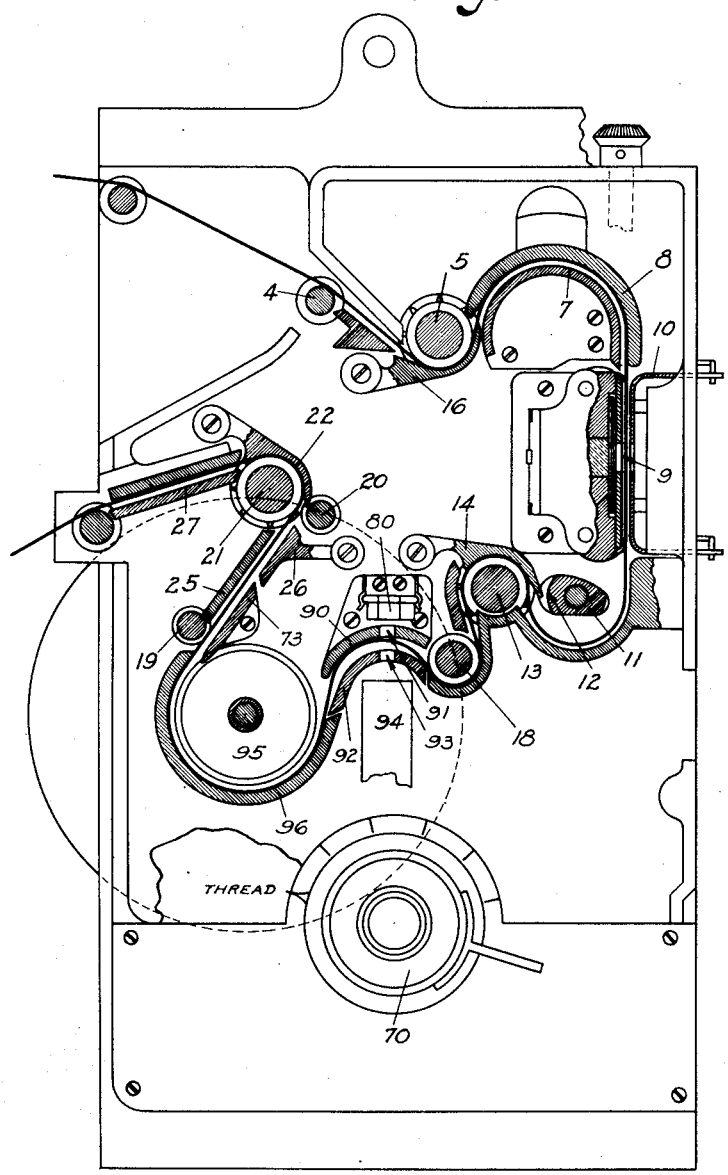
Fig. 6 is a front view, partly in section, of the projector and sound system housing showing an alternative sound system to that of Figs. 1, 4 and 5, and with the movable film guiding members adjusted to the automatic threading position.

Fig. 6, like Fig. 4, shows the projector and sound system mechanism adjusted by the control knob 70 to the automatic threading position. Fig. 6, however, illustrates an alternative sound system to that shown in Figs. 1, 4 and 5.

The automatic threading operation with the arrangement of Fig. 6 is accomplished by the same mechanism as that shown in Fig. 4 up to and including the intermediate sprocket 13. But, in the case of Fig. 6, there is interposed between the intermediate sprocket 13 and the take-up sprocket 21 a sound system which includes an openable curved sound gate 90. The sound gate 90 is provided with an aperture 91 and a movable member 92 also provided with an aperture 93, through which apertures the exciter lamp light rays may be directed from the optical system 94 to the light sensitive or selenium cell 80.

To the left of the sound gate 90, a freely rotatable drum 95 is mounted and the drum shoe 96 serves to guide the film from the sound gate 90 around the drum 95 to the guiding channel formed by the roller 19, the fixed guide 73 and the movable member 25. Also cooperating with the movable member 25 is the movable guide shoe 26 which, as in the case of Fig. 4, serves to guide the film to the take-up sprocket 21 in the manner already described.

It will therefore be observed that the arrangement of Fig. 6, insofar as the automatic threading operation is concerned, operates much in the same manner as the arrangement illustrated in Fig. 4, so that, when the control knob 70 is adjusted to the threading position, the driving motor, by rotating the sprockets 5, 13 and 21, automatically feeds the film throughout the entire projector and sound system mechanisms through substantially continuous and open guiding channels between sprockets and from sprocket to sprocket.

Figure 7:
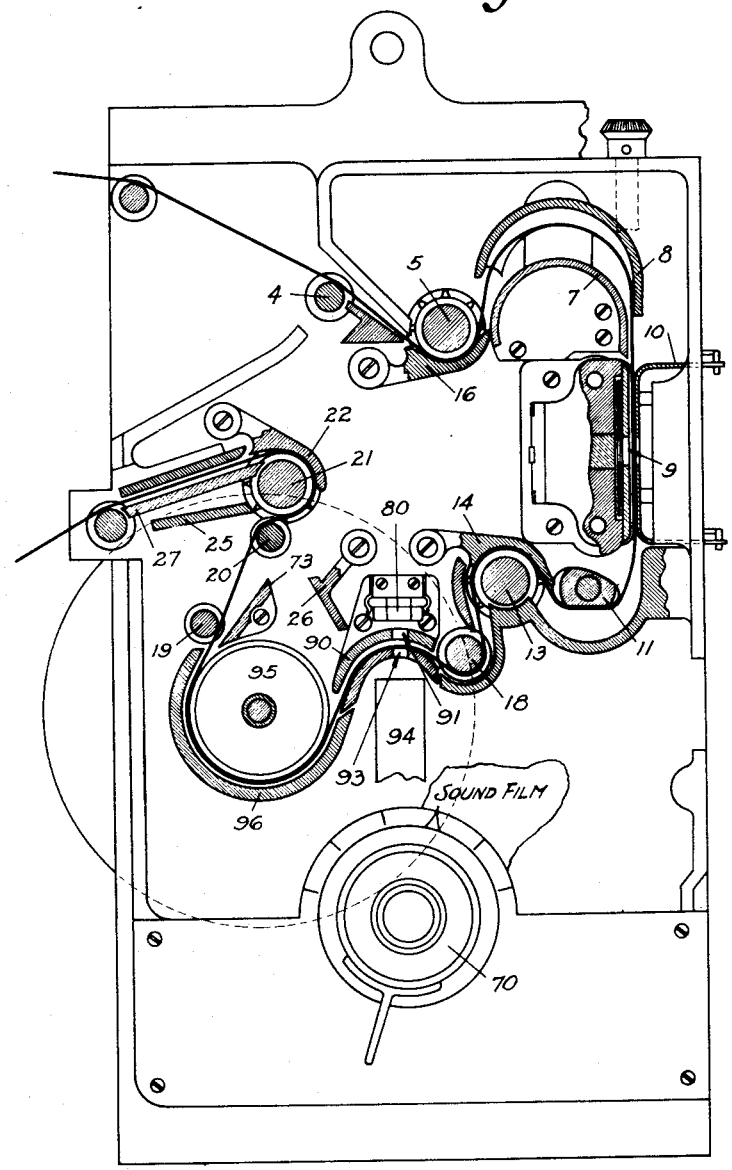
Fig. 7 shows the movable film guiding members and the alternative sound system of Fig. 6 adjusted to the running position.

Fig. 7 shows the sound system illustrated in Fig. 6 with the sound gate closed, and with the film in the running position, the automatic threading mechanism and its movable members having been adjusted by the control knob 70 to the position for picture and sound projection.

Thus, it will be observed as in the case of Fig. 5, the movable member 8 is slidably moved to a position which permits the formation of a free loop of the film above the picture gate 9, so that the rotary presser cam 11 may intermittently advance the film frictionally held in the picture gate.

Tension is applied to the film in the course of its passage through the sound gate 90 by the cooperative action of the film rollers 18 and 19, the steadying film drum 95, and the roller 20 carried by the spring-pressed roller frame 24 which is arranged in the manner shown in Fig. 1.

Figure 8:
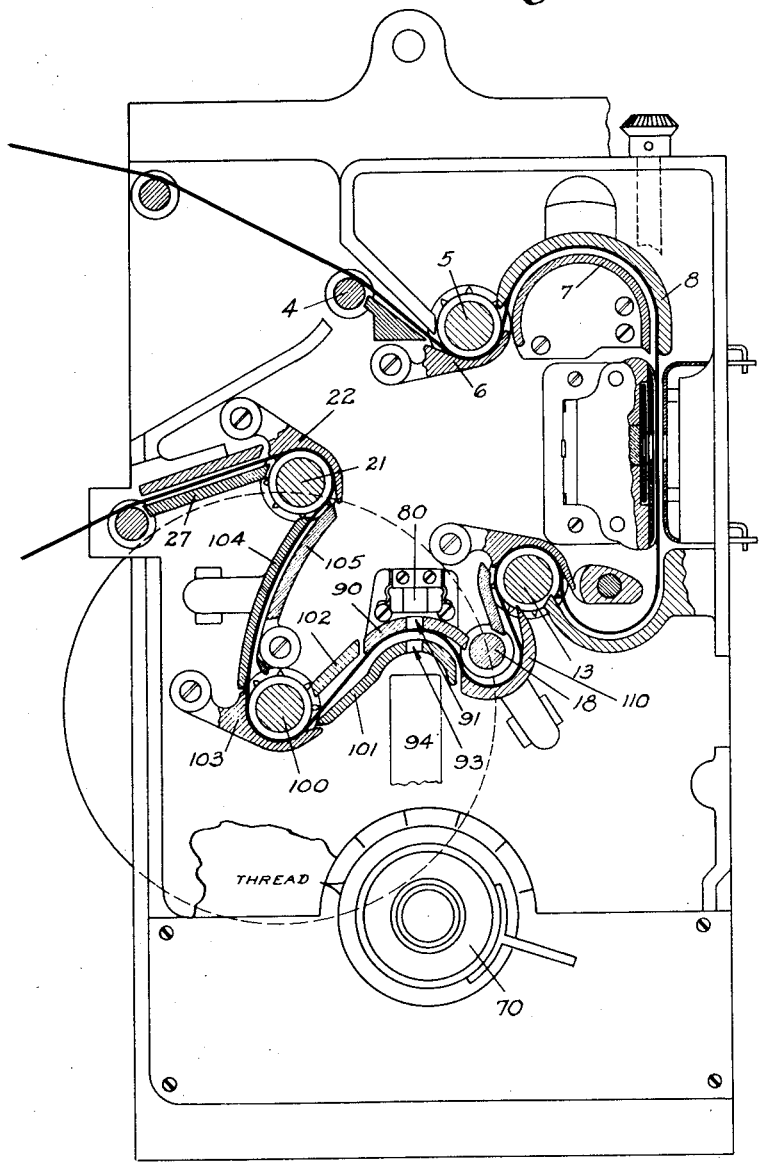
Fig. 8 is a front view, partly in section, of the projector and sound system housing illustrating a second alternative sound system to those of Figs. 1, 4 and 5 with the film guiding members adjusted to the automatic threading position.

Fig. 8 illustrates a second alternative sound system to that shown in Figs. 1, 4 and 5, and Figs. 6 and 7. Here a toothed sprocket 100, driven by the driving motor, is employed instead of a freely rotatable drum.

As in the arrangements illustrated in Figs. 4, 5, 6 and 7, the automatic threading operation is accomplished by the same general arrangement of fixed and movable guiding members up to and including the intermediate sprocket 13. And, like the arrangement of Figs. 6 and 7, it makes use of an openable curved gate 90. To guide the film to the gate 90, a curved movable guiding member 110 is arranged adjacent the roller 18. From the gate 90 on, the film is guided by the fixed guiding members 101 and 102 to the driven sprocket 100, where the film sprocket holes engage the sprocket teeth through the action of the spring-pressed shoe 103.

After the film is fed from the sprocket 100, it is guided to the take-up sprocket 21 by means of the fixed guide member 104 and the movable guide shoe 105. From the take-up sprocket 21, it is guided out of the projector and sound system housing in the manner heretofore described.

Figure 9:
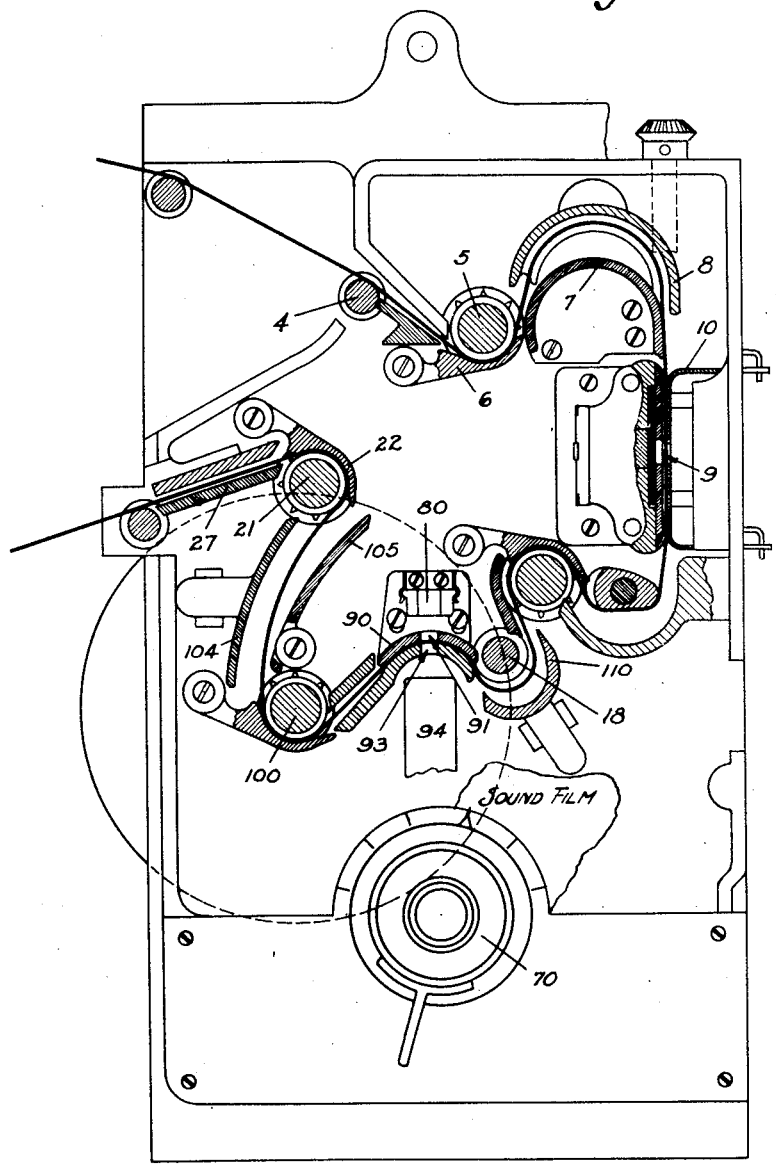
Fig. 9 shows the arrangement of Fig. 8, but with the film guiding members adjusted to the running position.

Fig. 9 shows the arrangement of Fig. 8 with the film in the running position, and with the automatic threading mechanism and its movable members adjusted by the control knob 70 to a position ready for picture and sound projection. Thus, the movable member 110 is withdrawn from the immediate vicinity of the roller 18, the sound gate 90 is closed, and the guide shoe 105 rotated back to a position out of film guiding action with respect to the spring-pressed shoe 22 of the take-up sprocket 21, thereby permitting a slight free loop (some slack) formation between the sprockets 100 and 21.

Figure 10:
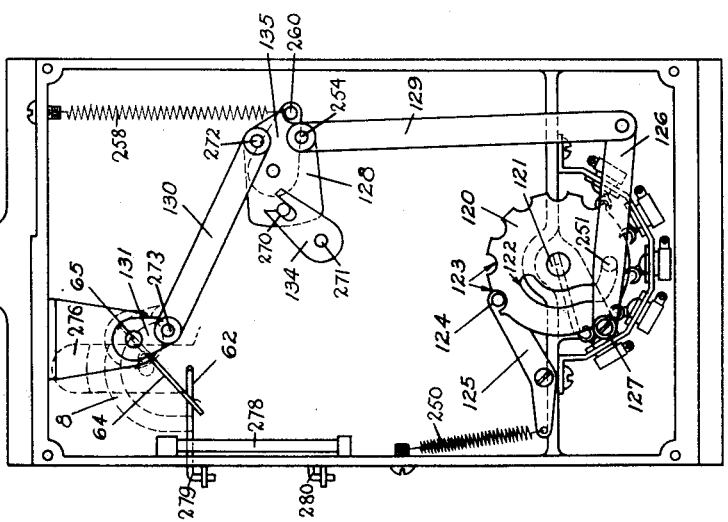
Fig. 10 is a rear view of the projector mechanism and sound system housing as illustrated in Fig. 1, showing the cam, link and lever actuating mechanism adjusted to the threading position, whereby the film guiding members are maintained in the relation illustrated in Fig. 4.

Fig. 10 shows the cam, crank, and link and lever mechanism which is actuated upon rotating the control knob 70 heretofore referred to. The master cam 120 is fixedly mounted upon the shaft 121 and is adapted to be rotated by the control knob 70. It is provided with a cam groove 122 and a series of stops 123 adapted to be releasably engaged by the pin 124 of the spring-pressed detent arm 125. Upon rotation of the master cam 120, the lever 126 is moved about the pin 127, thus rotating the master crank 128 by the upward movement of the link 129.

As illustrated in Fig. 10, the control knob 70 is adjusted to the automatic threading position and, in being rotated to that position, causes the master crank 128 to be rotated. Upon rotation of the master crank, the link 130 rotates the crank 131, which serves to raise or lower the slidably mounted curved film guiding member 8 heretofore described in connection with Figs. 4 to 9 inclusive. Also attached to the shaft 65 of crank 131 is the gate shifter pin 64, which actuates the spring-pressed pressure pad shifter finger 62, which in turn holds the pressure pad 10 from the picture gate.

Rotation of master crank 128 also serves to rotate the crank 134, which rotates the guide shoe 26 to its guiding position. Master crank 128 also serves to rotate the crank 135, which rotates the spring-pressed tension roller frame 24 carrying the tongue 25 to the film guiding position.

Thus, with the mechanism adjusted as shown in Fig. 10, the movable film-guiding members are positioned as shown in Fig. 4 for automatic threading.

Figure 11:
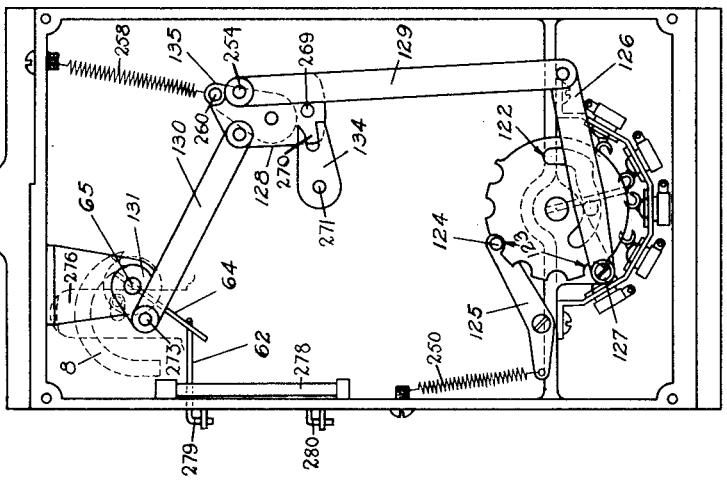
Fig. 11 shows the arrangement of Fig. 10, but with the cam, link and lever actuating mechanism so adjusted as to position the film guiding members in the running position, as illustrated in Fig. 5.

Fig. 11 shows the mechanism of Fig. 10 adjusted to the running position so that the movable film-guiding members provided for the automatic threading operation are in the position shown in Fig. 5.

Fig. 12, which is a rear view of Fig. 2, illustrates the manner in which the lamp housing B is secured to one side of the projector and sound system housing A by means of bolts 140 and heat-insulating washers 141. The reel holder housing C is secured to the housing A by means of screws 142.

It will also be observed from Fig. 12 that the intermittent light shutter 60 is mounted and journalled on the casing 3 of the housing A, and operates in a space between the casing 3 of the housing A and the casing 37' of the lamp housing B.

The lamp housing B is provided with a centrifugal blower fan, the outer casing for which is shown at 143, and the inlet and outlet ports are shown at 144 and 145 respectively. The fan is driven by the main projector driving motor and serves to ventilate and cool the projector lamp compartment.

The drive shaft 150 is provided with a worm portion which engages a worm wheel 151, mounted on the auxiliary driving shaft 152. The auxiliary driving shaft 152 may be mounted and journalled as shown on the casing 3, or may be arranged to be supported from a yoke frame attached to the central support 2. The auxiliary driving shaft 152, in turn, is provided with two spiral gears 153 and 154 which drive respectively the spiral gears 155 and 156, fixedly mounted upon the shafts of which are the feed sprocket and take-up sprocket respectively.

The drive shaft 150 is also provided with a train of gears 157 and 158 for rotating the light shutter 60. In addition, the shaft 150 drives the intermediate sprocket through the gear 159.

As pointed out in connection with Fig. 2, the take-up reel shaft 51 is driven by the projector mechanism, specifically the auxiliary driving shaft 152, by means of a spring belt 170 running over a pulley directly mounted on the shaft driving the take-up sprocket.

In Fig. 13 the electric driving motor 180 is shown directly coupled to the shaft 181 of the centrifugal fan for the lamp housing B. The motor 180 could quite as well be directly connected to the main driving shaft 150 of the projector mechanism. As illustrated, however, the shaft 150 is driven by means of a belt 182 and pulleys 183 and 184 mounted respectively on the shaft of the fan and the main driving shaft 150.

The method of projection is also made clear by Fig. 13 upon reference to the schematic illustration of the path of a light ray emitted from the projector lamp 30. For example, the light rays emitted from the incandescent filament of the projector lamp 30 are collected by the reflector 32 and pass through the condenser lens 31. A light aperture 190, arranged in the casing 37 of the lamp housing B, registers with the light aperture 191 in the casing 3 of the projector and sound system housing A. The picture gate 9 is arranged in this path and the light passing therethrough is reflected by the prism 192, which rotates the light beam through an angle of ninety degrees for the purposes of projection. Thereafter, the light rays pass through the projector lens (not shown) mounted in a lens tube 193, the position of which may be adjusted by rotation of the shaft 194 carrying a gear meshing with the rack 195. The shaft 194 is rotated by the shaft 1, as illustrated in Fig. 1, through a pair of beveled gears.

Referring now to Fig. 14, which shows a vertical mid-section of the lamp housing B, as the shaft 181 is rotated, the fan rotor 200, which is fixedly mounted thereon, draws in cool air through the inlet port 144 and blows the air through the port 201 into the compartment of the lamp housing B containing the projector lamp, whereupon the heated air is exhausted through the exhaust port 145. In this way, the heat radiated from the projector lamp is carried away in a large measure so that, not only is the lamp housing B thoroughly ventilated and maintained at a low temperature, but the heat generated by the projector lamp is not permitted to be radiated or conducted to the projector and sound housing A and its contained mechanism.

Fig. 15 illustrates the manner in which the drum 15 is mounted in the ball bearing mounting 210, fixed to the support 2 of the projector and sound system housing A. Thus, the drum 15 is rotated by the mere frictional contact with the film when maintained under tension, as heretofore described.

The mounting 210 includes the ball bearings 211 and 212 and the shaft 213 mounted therein. One end of the shaft 213 carries the drum 15 fixedly held by the thumb screw 214, while at the other end the steadying flywheel 215 is fixedly mounted by the nut 216.

The two sound gates or apertures 17 are provided so that either types of projection may be employed, namely, projection on a reflection screen or upon a translucent screen. When reflection projection is desired, the sound record track on the film will register with one of the sound gates 17 but, when a translucent screen is employed, the sound record track on the film will register with the other of the sound gates. In changing from one system of projection to the other, the film will necessarily have to be reversed before threading.

Figure 16:
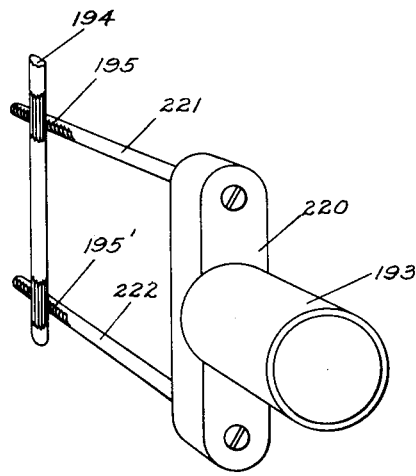
Fig. 16 illustrates the manner in which the projector lens is adjustably mounted for focusing.

Referring now to Fig. 16, the projector lens tube 193 is shown on its bar member support 220, which is provided with tail rods 221 and 222 provided with racks 195, 195'. Thus, upon rotation of the shaft 194, the pinion gears cut thereon mesh with the racks 195, 195' and serve to displace the member 220 carrying the lens tube 193, as will be understood. In this way the projector lens carried by the lens tube 193 may be adjusted for proper focus of the picture on the screen.

Figure 17:
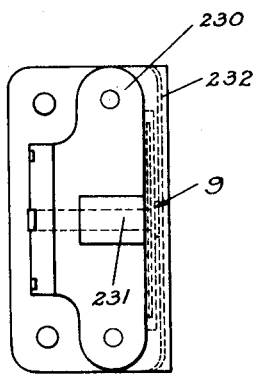
Fig. 17 is a side view of the framing plate assembly.
Figure 18:
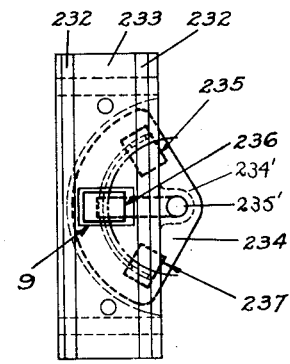
Fig. 18 is a front view of the framing plate assembly showing the adjustable multi-aperture plate for the picture gate.

Figs. 17 and 18 are side and front views respectively of the framing plate assembly 230, in which is arranged the picture gate 9. The right-angle reflecting prism 192 (shown in Fig. 13) is adapted to be mounted within the cutout portion 231.

The film, in passing by the picture gate 9, slides along the surface of the bearing plate 232, which is recessed as indicated at 233 so that only the side edges of the film are frictionally held on the surface of the bearing plate 232 by the action of the pressure pad 10, as illustrated in Fig. 5, for example.

As shown in Fig. 18, an adjustable multi-aperture plate 234 is provided for the purpose of masking the film sound record track when the film picture or picture frame is in registration with the picture gate 9. Thus, when the film, for example, is being projected on a reflection screen, and we assume that the sound record track is located to the left of the picture gate 9, as illustrated in Fig. 18, the multi-aperture plate 234 will be rotated so that the aperture 235 registers horizontally with the picture gate 9. On the other hand, if the film is reversed for the projection on a translucent screen, the sound record track on the film is then located to the right of the picture gate 9, as illustrated in Fig. 18. In this case the aperture plate 234 will be rotated in a position as shown so that the aperture 236 registers horizontally with the picture gate 9.

Provision is also made for the projection of silent film pictures, and to this end a third aperture 237 may be employed in horizontal registration with the picture gate 9 by rotating the multi-aperture plate 234 to the proper position.

At the back of plate member 234 is provided bearing member 234' shown in dotted lines within which a shaft 235' is journalled. The plate member 234 is suitably attached to the shaft 235'.

Figure 19:
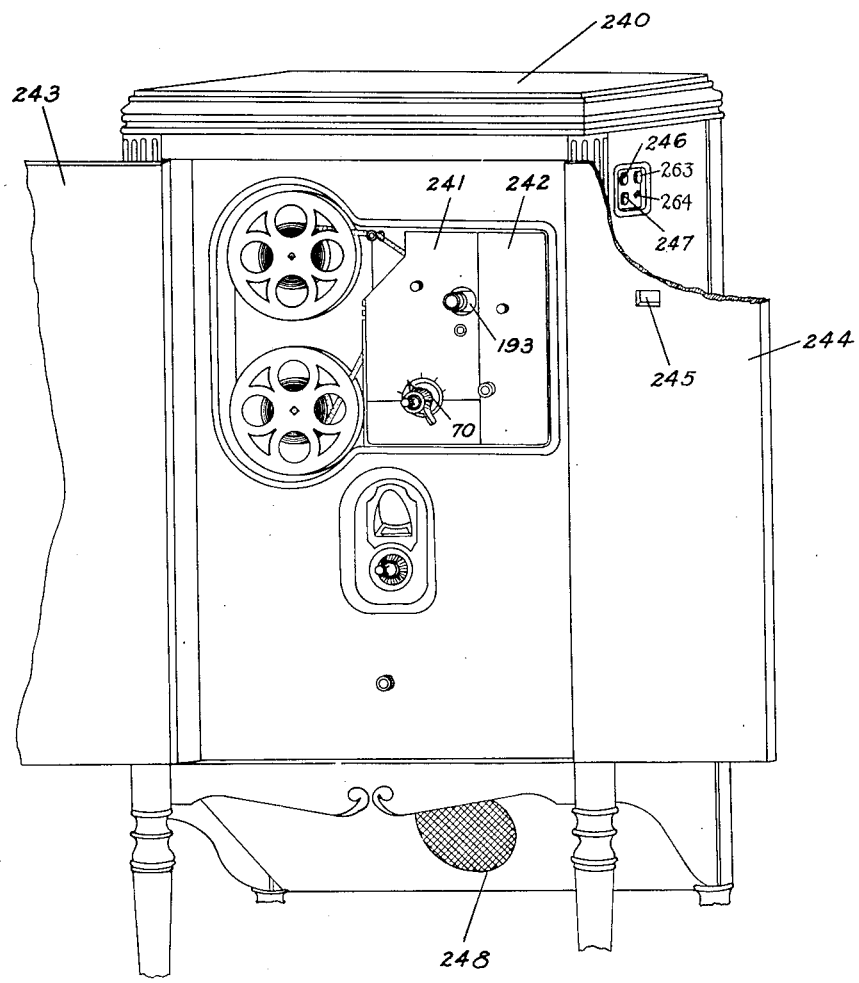
Fig. 19 shows the multiple-unit chassis mounted in a cabinet ready for sound and picture projection.

Fig. 19 illustrates the multiple-unit chassis of Fig. 2 arranged in a cabinet 240 with the cover plates 241 and 242 applied to the housings A and B of Fig. 2. The doors 243 and 244 may be closed during picture and sound projection, and to this end a slot or aperture 245 is so disposed in the door 244 that the lens tube 193 may project therethrough.

To the end that framing and focusing may be accomplished during projection when the doors of the cabinet are closed, controls 246 and 247 are provided in the form of knurled knobs which rotate the shafts 29 and 1 respectively, illustrated in Fig. 2, for the purposes hereinbefore described.

The cabinet 240 also contains an electrical amplifier which may be designed specifically for amplifying the audio frequency electrical variations produced by the light sensitive cell corresponding to the modulated light produced by the sound-on-film record track. If the cabinet 240 is arranged to house a radio receiver chassis, then the audio frequency portion of such radio receiver may be employed for the purpose of amplifying the output of the light sensitive cell. In any case, the loud speaker 248, arranged at the bottom of the cabinet, converts the audio frequency electrical variations into sound waves for the sound picture projection.

The preceding description of the projector apparatus has dealt with the operation of the various levers, loop formers, feeding mechanisms, etc., to accomplish automatic threading. The following description deals with the emergency stop switch and its cooperation with the self-threading mechanism.

Figure 20:
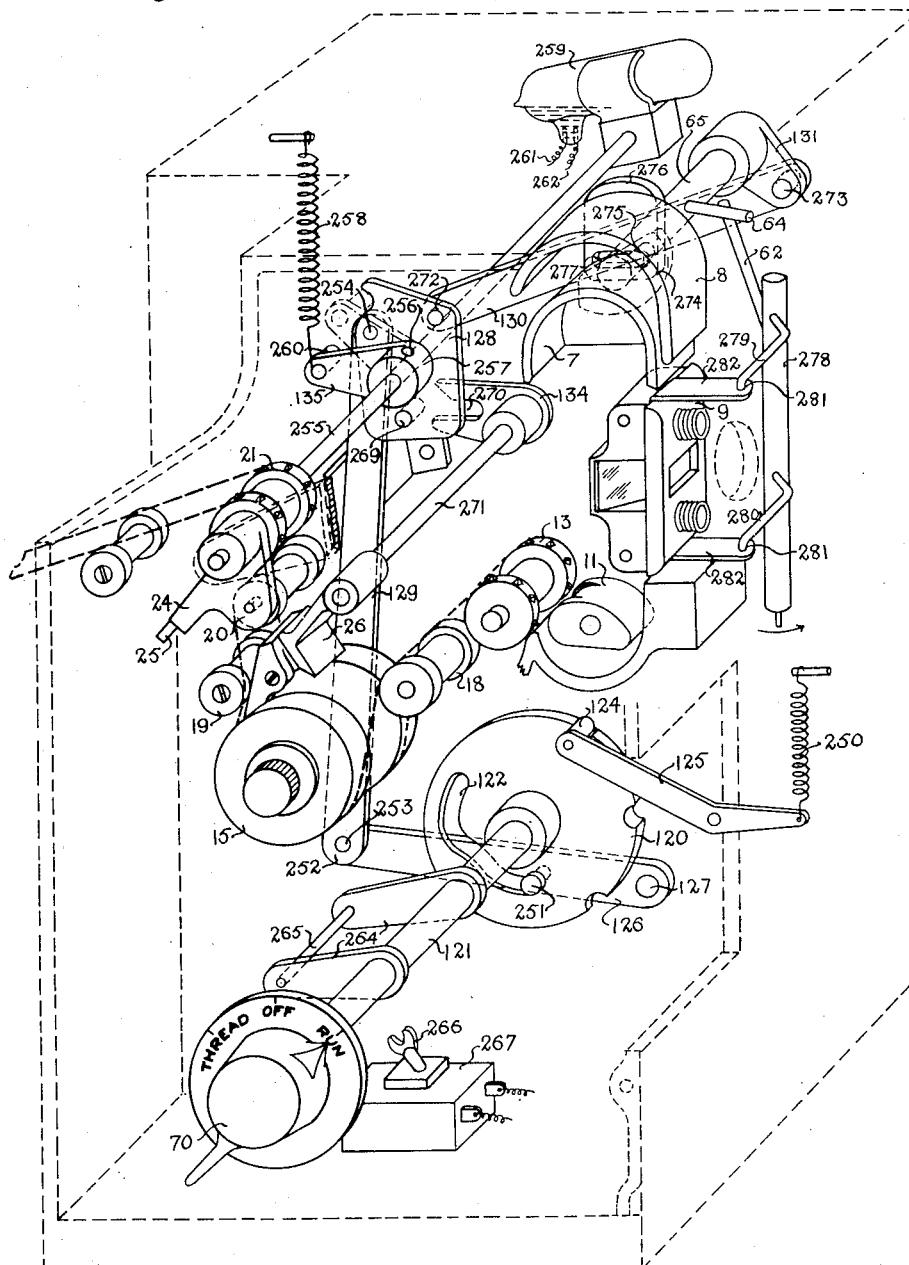
Fig. 20 shows in further detail the control mechanism of Figs. 10 and 11 and is a perspective view, with certain parts broken away or omitted, of the various switching mechanisms operated by the control knob.

In Fig. 20, the operating knob 70 controls the entire mechanism for self-threading as heretofore described, and the emergency stop switch as well. This knob 70 is securely fastened through shaft 121 to a combination cam and detent 120. As shown this knob has three positions, but it may have any greater number according to the connected equipment.

The combination cam and detent disc 120 is rotated by hand through knob 70 and held in any one of its adjusted positions by roller 124 mounted on detent arm 125, spring 250 creating the necessary pressure to hold the disc 120 in any given position. In one side of the cam detent disc 120 is a cam groove 122 which is arranged to cooperate with lever 126 through contact with roller 251. Lever 126 is pivoted on a stud at 127 which stud is secured immovable to the frame of the machine.

Operation of the knob 70 therefore moves the end 252 of lever 126 in an arc around stud 127. Cam lever 126 is pivoted through pin 254 to master crank 128. Master crank 128 is loosely mounted on shaft 255 so that any movement of lever 126 by the cam groove 122 causes master crank 128 to rotate through a proportionate angle around shaft 255. Crank 135 is securely fastened to shaft 255 by pin 256 through bushing 257, as shown in full lines (which position it occupies when the machine is threaded for operation condition). Crank 135 and shaft 255 are urged by spring 258 in a clock-wise direction around the center of shaft 255. Crank 135 is supported in this position by pressure of the film on roller 20, the tension roller frame 24 being fixed to shaft 255.

A tight loop of film is maintained between sprockets 13 and 21, the path of this film being shown in Fig. 20 in heavy black dashes. Sprockets 13 and 21 are mechanically connected together and rotate at the same speed in the same direction, and therefore support a given amount of film between them. Sprocket 21 is loosely mounted on shaft 255 and therefore the rotation of this sprocket has no effect on shaft 255 or its connected switches, arms, etc. This loop of film between sprockets 13 and 21 is predetermined in self-threading by the amount of looseness in the threading channels in the mechanism heretofore described. The tight loop of film between sprockets 13 and 21 supports roller 20 which is spring pressed against the film by the action of spring 258 through crank 135.

At the opposite end of shaft 255 from tension roller frame 24 is located an emergency stop switch 259, of the mercury type. In Fig. 20 the switch 259 is shown in closed position, being held in this position by the tight loop of film between sprockets 13 and 21 which prevents spring 258 from rotating shaft 255 when in running position. However, at the end of a reel of film, or in the event of a breakage in the film line between sprockets 13 and 21, the tight loop of film heretofore mentioned ceases to exist and allows spring 258 to rotate shaft 255 through crank 135 until pin 260 strikes master crank 128 which is shown in dotted lines. This action also rotates mercury switch 259 in a clock-wise direction allowing the mercury to flow away from the contacts 261 and 262, which opens the circuit therebetween.

Figures 21, 22:
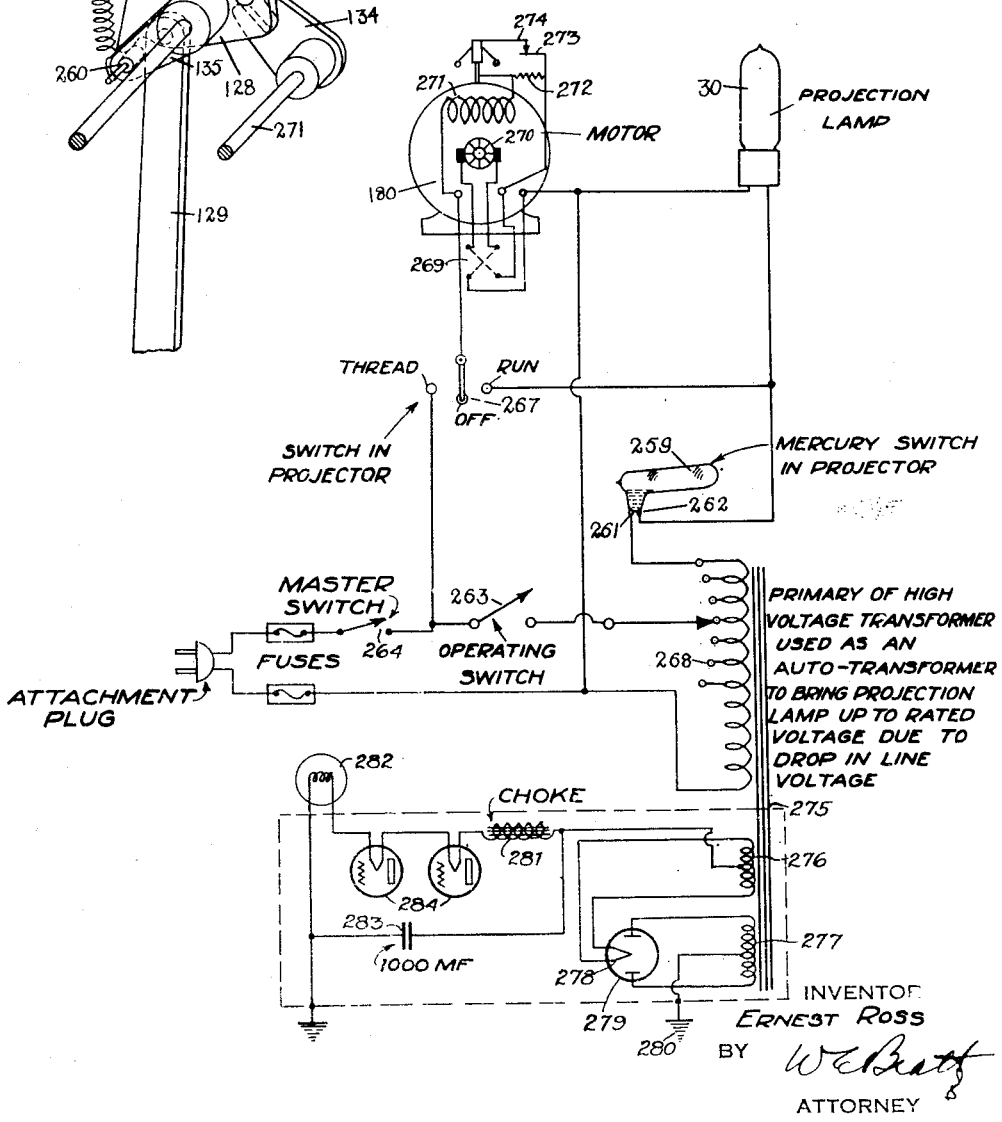
Fig. 21 is a perspective view of a mercury switch in an adjusted position different from that shown in Fig. 20.
Fig. 22 is a schematic circuit diagram showing the circuit connections for the motor, projection lamp, and for the switching devices of Figs. 20 and 21.

It will be seen from Fig. 22 that with the circuit open at contacts 261 and 262 the motor 180 stops and the projection lamp 30 is extinguished.

In re-threading the machine, switch 263, Fig. 22, is first opened manually, then knob 70 is rotated in a counterclock-wise direction to the thread position. On shaft 121 are securely fastened two spaced arms 264 conjoined by the switch arm 265. As knob 70 is rotated in counterclock-wise direction, switch arm 265 sweeps through notch 266 in the operating handle of switch 267 which is a single pole double throw switch shown in Fig. 22. In thread position, this connects the motor 180 direct to the line for self-threading operation and disconnects the lamp 30 and the auto-transformer winding 268 in Fig. 22, the motor only operating at this time.

Any convenient number of switches as shown in Figs. 10 and 11 can be mounted in an arc through which arm 265 sweeps for the operation of phonographs, still pictures and other desirable features. It is understood, however, that detent disc 120 will have notches proportionate to the number of positions to which knob 70 is to be set.

Now if we consider the machine to be entirely unthreaded, the last end of the previous reel having passed sprocket 21, mercury switch 259 being open, crank 136 being in position shown in Fig. 20, switch 263 in Fig. 22 open, and the machine otherwise as shown in Fig. 20, we will proceed to thread the same for the projection of a new reel of film. Knob 70 is turned to thread position. In turning this knob to thread position, a number of mechanical actions take place as follows:

Detent disc 120 rotates, forcing lever 126 downwards around pin 127 as a center through roller 251. This exerts a downward motion to link 129 which causes master crank 128 to rotate in a counterclockwise direction around shaft 255. Master crank 128 in rotating carries with it crank 135, extending spring 258. Pin 260 in master crank 128 engages slot 270 in arm 134. Arm 134 is tightly secured to shaft 271 at the opposite end of which is secured a part of the threading channel mechanism 26, the operation of which has been heretofore described. Master crank 128 in rotating also rotates pin 272 which is fastened to it. This causes motion of link 130 and turns shaft 65 through arm 131 and pin 273 in a clock-wise direction. Arm 131 is securely fastened to shaft 65. At the forward end of shaft 65 is secured arm 274 (in dotted lines in Fig. 20), which has in it pin 275. Pin 275 engages a longitudinal slot 277 as shown in part 276. Part 276 is securely fastened to the upper loop former 8 which is so guided that it has movement in a vertical direction only. The rotation of shaft 65 through arm 274 and pin 275 working in the elongated slot 277 moves loop former 8 downwardly until it forms a narrow channel between part 7, which is the stationary loop former, and the movable loop former 8. Master crank 128 in rotating causes shaft 255 to rotate through the contact with pin 260 on lever 135. Mercury switch 259 also rotates and allows the mercury to flow to the contacts 261 and 262 which closes the circuit of motor 180 and lamp 30.

Fig. 21 shows the position of the above-described elements in the threading position. In this position switch 267 being in a threading position, the closing of mercury switch 259 does not light the projector lamp 30. The operation of threading merely sets this switch 259 in its closed position so that when the knob is set at run position, the film being threaded in the machine and holding the mercury switch 259 as heretofore mentioned in its closed position, the projector is ready to operate by the closing of switch 263.

Referring to Fig. 20, opening the picture gate 9 creates a clear threading channel for the film to follow when knob 70 is in its threading position. This condition is brought about by pin 64 in shaft 65 which, when rotating, contacts against arm 62 in vertical shaft 278 causing it to rotate in a counterclockwise direction (as shown by the small arrow on the end of the shaft). Arms 279 and 280 are secured to shaft 278 the ends of which arms engage in apertures 281 in tabs 282 which are integral extensions from gate 9. Upon completion of the threading operation knob 70 is returned to the "run" position and the projector mechanism again assumes the positions as shown in Fig. 20 when the operation of projecting sound and pictures can be initiated by the closing of switch 263.

Through suitable connections not shown, and well understood in the art, the direction of rotation of the motor 180 may be reversed to reverse the direction of the film through the apparatus, in order to repeat the reproduction of a portion of the film, or to project one of the film frames as a still picture. Referring to Fig. 5, when the motor 180 is reversed, the loop above the picture gate 9 will disappear and a loop will appear around the presser cam 11. In this case, the presser cam 11 does not function as an intermittent motion device for the film. The film will be drawn through the picture gate by the sprocket 5 with a continuous motion. The projection of the picture of course will be unsatisfactory, but the film will not break. There will be a free loop in the pocket below the presser cam 11 when the apparatus is running reversed. When running ahead in the normal direction, there is of course no free loop between the picture cam 9 and the sound gate 17. The apparatus of Figs. 8 and 9 will also run backwards, a free loop being shown at the slidable shoe 110. Sprocket 100 will force the film backwards through the tunnel and through the gate 90, the pressure at this point being not too great, a free loop being established at the shoe 110. The operation from there on will be the same as in Fig. 5, with a free loop around the cam 11, the film passing backwards through the picture gate 9 with a continuous motion and not intermittently.

Reversal of the motor 180 is accomplished by the switch 269 which serves to reverse the connections of the armature 270 with reference to the field winding 271. The speed of the motor 180 is regulated in any suitable way, for example by resistance 272 in series with the field 271, this resistance being shunted by contacts 273 under control of a centrifugal device 274 as is well understood.

The auto transformer winding 268 is provided with a core 275. On the core 275, and inductively related to the winding 268, are windings 276 and 277, the former supplying current to the filament 278 of a full wave rectifier 279, and the latter supplying space current therefor. The midpoint of winding 277 is connected to ground 280. The midpoint of winding 276 is connected through choke coil 281, the exciter lamp 282 to ground as shown. In shunt to the choke 281 and the lamp 282 is a condenser 283. The choke 281 and condenser 283 serve to filter out ripples in the current as is well understood. The rectifier 279 also serves to supply filament current for a suitable number of amplifiers illustrated at 284, these amplifiers being employed in the sound reproduction circuit not otherwise illustrated, this circuit of course including the light sensitive cell 80.

Having thus described the invention what is claimed as new and desired to secure by Letters Patent is:

1. Automatic film threading mechanism for a combined sound reproducer and picture projector comprising adjustable guide members for the film, means for engaging and propelling the free end of a film through the picture projector and sound reproducer and through the guide members therefor, a film operated switch, a film pulled drum, a sprocket for advancing a film over said drum, tension means adapted to prevent speed fluctuations of said sprocket from reaching said drum, said means being connected to said film operated switch, means under control of the operator and movable by the operator to a plurality of positions in one of which said guide members are operated to adapt self-threading of the film and in another of which said guide members are operated to permit sound and picture reproduction from the film, and means adapted to be operated by said second mentioned means for removing said film operated switch from the film path during the self-threading operation.

2. Automatic film threading mechanism for a combined sound reproducer and picture projector comprising stationary and movable loop forming members, adjustable guide members for the film, means for supporting said movable loop forming member for movement toward and away from said stationary loop forming member, in a straight line, sprocket means for engaging and propelling the free end of a film through the picture projector and sound reproducer and through the loop former and guide members therefor, a film pulled drum, one of said sprocket means advancing said film over said drum, film guide means between said last mentioned sprocket means and said drum, a film operated switch connected to said film guiding means, said film guide means including means for minimizing speed fluctuations of said sprocket means with respect to said drum, and means under control of the operator and movable by the operator to a plurality of positions in one of which said loop former, guide members and film guide means are operated to adapt self-threading of the film and in another of which said loop former, guide members and film guide means are operated to permit sound and picture reproduction from the film and to position said film operated switch in operative position.

3. Sound and motion picture projector apparatus comprising a film gate for the picture, a film sound reproducer, means providing a self-threading path for film through said film gate and said sound reproducer in series, a film pulled drum, a sprocket for advancing said film over said drum, a device adapted to be supported by film in the film path between said drum and said sprocket and movable across said path in the absence of film, tension means adapted to urge said device across said film path, said device and tension means therefor providing means for preventing speed irregularities of said continuous sprocket from reaching said drum, a stop switch responsive to said device, a handle, means controlled by said handle for moving said device out of said film path and for opening a threading channel through said projector and said sound reproducer, and means substantially independent of said last mentioned means for permitting said device to control said stop switch.

4. Combined motion picture projector and sound reproducing apparatus comprising self-threading apparatus for the projector and sound reproducer, a hand-operated device for moving said self-threading apparatus to "thread" position for self-threading and to "run" position for sound and picture reproduction, a motor for the projector and sound reproducer, a stop switch, a power switch, and connections between said self-threading apparatus, said stop switch, and said power switch respectively and said hand-operated device whereby a circuit is established through said motor independently of said stop switch when said hand-operated device is in "thread" position and whereby a circuit is established through said motor and said stop switch in series when said hand-operated device is in "run" position.

5. A picture projector and sound reproducer comprising a picture gate, a supply reel, a sprocket for feeding a film from said supply reel to said picture gate, an intermittent mechanism for advancing said film thru said gate, a light source and optical system for projecting pictures carried by the film thru said gate, a film pulled flywheel drum, a light sensitive element positioned within said drum, means for projecting a light beam through said film to said light sensitive element, a sprocket adapted to continuously advance said film over said drum, a tension roller intermediate said drum and said continuous sprocket, straight line film guiding means for guiding said film from said drum to said continuous sprocket, said means supporting said tension roller, a take up reel, means for guiding said film to said take up reel after passing over said continuous sprocket, a wall structure, a stationary curved film guide carried by said wall structure adjacent to said picture gate, a curved loop former for said picture gate adjacent said film guide, a slide member formed on said loop former and engaging a guideway formed on said wall structure, said loop former being adapted to be guided toward and away from said stationary guide along a straight line and a handle operatively connected to said loop former, said picture gate and straight line guiding means, whereby in one position of said handle said picture gate is opened, said loop former is moved adjacent said stationary guide for threading said film and said straight line guiding means is positioned to guide said film from said drum to said last mentioned sprocket and in another position of said handle, said picture gate is closed, said loop former is moved away from said stationary guide for passing said film thru said picture gate in a normal picture projection position and said straight line guiding means is removed from the film path between said drum and said last mentioned sprocket, said tension roller being positioned against said film.

6. A picture projector and reproducer comprising a picture gate, a sprocket for feeding a film to said gate, a light source and optical system for projecting pictures carried by the film thru said gate, a film pulled drum means for guiding said film from said film gate, a sprocket for advancing said film over said drum, a tension roller intermediate said drum and last mentioned sprocket, straight line film guiding means intermediate said drum and said last mentioned sprocket, said means moving said tension roller to operative position on one side of said film path, an electric switch under control of said roller, a stationary curved film guide adjacent said picture gate, a curved loop former for said picture gate adjacent said film guide and adapted to be moved in a straight line to and from said stationary guide, and a handle operatively connected to said loop former, said picture gate and said straight line film guiding means whereby in one position of said handle said picture gate is opened, said loop former is moved adjacent said stationary guide, said straight line film guiding means and said roller are positioned for threading said film and in another position of said handle, said picture gate is closed, said loop former is moved away from said stationary guide and said straight line film guiding means is removed, said roller being released for bearing against said film between said drum and said last mentioned sprocket for passing said film thru said picture gate and sound reproducer in a normal picture projecting and sound reproducing position, said roller maintaining said switch in a closed position until there is an absence of film between said last mentioned sprocket and drum.

7. A motion picture and sound reproducing apparatus comprising a picture gate, a film pulled drum rotatable means for feeding a film to said gate, rotatable means for advancing film over said drum mechanism for advancing the film thru said picture gate, a pair of film guide members adjacent said picture gate having convex and concave surfaces respectively, said convex and concave surfaces being adjacent each other, one of said members being adapted to be moved to and from the other of said members in a straight line, a plurality of film guiding members intermediate said means for advancing the film over said drum and said drum for guiding film between said drum and said means in a straight line, said film guiding means supporting a roller for tensioning the film between said drum and said advancing means when certain of said plurality of film guiding members are moved, and a handle operatively connected to said movable member and to said picture gate whereby said gate may be opened to allow a film to be threaded therethru, said guide members may be moved together to form a loop of film of predetermined size and said plurality of film guiding means may be moved together to form a straight line film path between said drum and said film advancing means.

8. A sound picture projector comprising a sound gate, a picture gate, a threading channel therefor, means for propelling the free end of a film through said gates and said channel, a motor therefor, a circuit breaker for said motor and adapted to operate in the absence of film in said channel, common means adapted to control the operation of said propelling means and also adapted to place said circuit breaker under control of the film in said channel, and means comprising a loose connection between said common means and said circuit breaker for controlling said propelling means independent of said common means.

9. A sound picture projector comprising a sound gate, a picture gate, a threading channel therefor, means for automatically threading a film through said gates and said channel, a motor therefor, a circuit breaker for said motor, and adapted to operate in the absence of film in said channel, common means adapted to control the operation of said threading means and also adapted to place said circuit breaker under control of the film in said channel, and means comprising a loose connection between said common means and said circuit breaker for controlling said threading means independently of said common means.

ERNEST ROSS.